(12) United States Patent
Miyabe et al.

(10) Patent No.: US 7,715,674 B2
(45) Date of Patent: May 11, 2010

(54) OPTICAL FIBER AND WAVEGUIDE (75) Inventors: Ryo Miyabe, Tokyo (JP); Ryuichi Sugizaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 209 days.

(21) Appl. No.: 11/908,975

(22) PCT Filed: Mar. 20, 2006

(86) PCT No.: PCT/JP2006/305521

§ 371 (c)(1),
(2), (4) Date: Sep. 18, 2007

(87) PCT Pub. No.: WO2006/098471

PCT Pub. Date: Sep. 21, 2006

(65) Prior Publication Data

US 2009/0052854 A1 Feb. 26, 2009

(30) Foreign Application Priority Data

Mar. 18, 2005 (JP) .............................. 2005-080295

(51) Int. Cl.
*G02B 6/02* (2006.01)
*G02B 6/036* (2006.01)
(52) U.S. Cl. ...................... 385/127; 385/126; 385/144
(58) Field of Classification Search ......... 385/123–128, 385/144
See application file for complete search history.

(56) References Cited

U.S. PATENT DOCUMENTS

| 6,901,197 | B2 * | 5/2005 | Hasegawa et al. ........... 385/125 |
| 7,085,464 | B2 | 8/2006 | Miyabe et al. |
| 7,164,830 | B2 | 1/2007 | Hiroishi et al. |
| 7,228,040 | B2 * | 6/2007 | Nakajima et al. ........... 385/125 |

(Continued)

FOREIGN PATENT DOCUMENTS

JP     3306847     7/2002

(Continued)

OTHER PUBLICATIONS

U.S. Appl. No. 12/169,182, filed Jul. 8, 2008, Miyabe, et al.

(Continued)

*Primary Examiner*—Daniel Petkovsek
(74) *Attorney, Agent, or Firm*—Oblon, Spivak, McClelland, Maier & Neustadt, L.L.P.

(57) ABSTRACT

An optical fiber in which the macro-bending loss is lowered while an MFD is maintained large, and a waveguide including the optical fiber. The optical fiber includes a core region doped with an impurity; a first cladding region formed as a layer around the core region and including holes as microstructures; and a second cladding region formed as a layer around the first cladding region and made of a homogeneous material. A relative refractive-index difference $\Delta 1$ between the core region and the second cladding region is equal to or higher than 0.01% and lower than 0.3%. A total cross-sectional area of the holes in the first cladding region with respect to a total cross-sectional area of the core region, the first cladding region, and the second cladding region is equal to or smaller than 20%. A waveguide is formed using the optical fiber.

28 Claims, 3 Drawing Sheets

U.S. PATENT DOCUMENTS

| | | | |
|---|---|---|---|
| 7,283,711 B2 * | 10/2007 | Bayart et al. | 385/125 |
| 2002/0118938 A1 * | 8/2002 | Hasegawa et al. | 385/125 |
| 2006/0213230 A1 | 9/2006 | Miyabe et al. | |

FOREIGN PATENT DOCUMENTS

| | | |
|---|---|---|
| JP | 2002-323625 | 11/2002 |
| JP | 2004-522195 | 7/2004 |
| JP | 2004-220026 | 8/2004 |
| JP | 2004-226540 | 8/2004 |

OTHER PUBLICATIONS

U.S. Appl. No. 12/187,025, filed Aug. 6, 2008, Miyabe et al.
Hasegawa, T. et al., "Recent Advances in Applications of Holey Fibers", $9^{TH}$ Microoptics Conference (MOC'03), 2003.
Nishioka, Daizo et al., " Development of A Holey fiber with Ultra-low Bending Loss", Technical Report of IEICE, pp. 23-26, 2003.
U.S. Appl. No. 11/791,855, filed May 30, 2007, Miyabe, et al.
U.S. Appl. No. 11/815,243, filed Aug. 1, 2007, Miyabe, et al.
U.S. Appl. No. 11/909,045, filed Sep. 18, 2007, Miyabe, et al.
U.S. Appl. No. 12/406,483, filed Mar. 18, 2009, Miyabe, et al.

* cited by examiner

OPTICAL FIBER AND WAVEGUIDE

TECHNICAL FIELD

The present invention relates to an optical fiber including a microstructure, and a waveguide employing the optical fiber.

BACKGROUND ART

In general, an optical fiber includes a core region and a cladding region. The core region is made of a silica glass of which a refractive index is increased by doping, for example, a germanium. The cladding region is made of a silica glass having a refractive index lower than that of the core region, which forms a layer surrounding a circumference of the core. Light propagates through the core region by a total reflection of the light at a boundary between the core region and the cladding region. Conventionally, a relative refractive index difference between the core region and the cladding region is at largest 3% to 4%.

On the other hand, in recent years, an optical fiber has been reported with which a large relative refractive-index difference can be obtained compared to the above structured optical fiber. For example, in Patent Document 1, it has been reported that an average refractive index of the cladding region can be greatly reduced by providing a microstructure such as a hole as a representative example in the glass of the cladding region, in a longitudinal direction. In other words, the optical fiber having such structure can dramatically increase an effective refractive index of the core region compared to the conventional optical fiber.

Given this situation, in recent years, an optical fiber having the microstructure has been a focus of constant attention, in which a hole or the like is formed in a surrounding area of the core region of an optical fiber having a refractive index profile structure equivalent to a typical single mode optical fiber (hereinafter, referred to as SMF). This optical fiber has an advantage in that the microstructure provided around the core region can increase the relative refractive-index difference between the core region and the cladding region, which cannot be achieved with an SMF, thereby making the macro-bending loss of the optical fiber extremely low.

For instance, it has been reported that the macro-bending loss against a small-diameter bending with a diameter of 15 mm could be lowered to 0.04 dB/m by adopting the microstructure (see, for example, Nonpatent Document 1). After that, there has been another report that the macro-bending loss could be further lowered up to below 0.01 dB/m (see, for example, Nonpatent Document 2). On the other hand, an optical fiber has been proposed, in which the macro-bending loss is lowered while maintaining a large mode field diameter (hereinafter, referred to as MFD) in view of connection with the conventional SMF (see, for example, Patent Document 2).

Patent Document 1: Japanese Patent No. 3306847

Nonpatent Document 1: T. Hasegawa, et al., Microoptics Conference (2003), K2

Nonpatent Document 2: Daizo Nishioka, et al., Shingaku Giho, OFT 2003-63, P.23

Patent Document 2: Japanese Patent Application Laid-Open No. 2004 220026

DISCLOSURE OF INVENTION

Problem to be Solved by the Invention

Such an optical fiber needs to be highly reliable and easy to handle. For example, the optical fiber with the MFD and the macro-bending loss as proposed in Patent document 1 is still insufficient for practical use.

The present invention is made in view of the above problem. An object of the present invention is to provide an optical fiber in which the macro-bending loss is lowered while the MFD is maintained large. Another object of the present invention is to provide a waveguide that includes the optical fiber and that is connectable to an SMF with a low loss and is capable of making the macro-bending loss low even when a bending portion having a small curvature radius is formed.

Means for Solving Problem

To solve the above problems and to achieve the object, an optical fiber according to a first invention of the present invention includes a core region that is doped with an impurity; a first cladding region that is formed in a layered structure around the core region, the first cladding region including a microstructure; and a second cladding region that is formed in a layered structure around the first cladding region, the second cladding region including a homogeneous material. A relative refractive-index difference $\Delta 1$ between the core region and the second cladding region is equal to or higher than 0.01% and equal to or lower than 0.3%.

The optical fiber according to a second invention of the present invention is characterized by a fact that a ratio of a total cross-sectional area of the microstructure of the first cladding region to a total cross-sectional area of the core region, the first cladding region, and the second cladding region is less than 20%.

The optical fiber according to a third invention of the present invention is characterized by a fact that a cross-sectional shape of an arrangement of the microstructure of the first cladding region is two folds rotational symmetric with respect to a center axis.

The optical fiber according to a fourth invention of the present invention is characterized by a fact that a cross-sectional shape of an arrangement of the microstructure of the first cladding region is six folds rotational symmetric with respect to a center axis.

The optical fiber according to a fifth invention of the present invention is characterized by a fact that a cross-sectional shape of an arrangement of the microstructure of the first cladding region is four folds rotational symmetric with respect to a center axis.

The optical fiber according to a sixth invention of the present invention is characterized by a fact that at least three of the microstructure are arranged on an identical circumference of a circle in a lateral cross section of the optical fiber.

The optical fiber according to a seventh invention of the present invention is characterized by a fact that the microstructure is arranged on two or more circumferences of circles having different diameters.

The optical fiber according to an eighth invention of the present invention is characterized by a fact that the core region includes a silica glass that is doped with at least one of germanium and phosphor.

The optical fiber according to a ninth invention of the present invention is characterized by a fact that the second cladding region includes a pure silica glass.

The optical fiber according to a tenth invention of the present invention is characterized by a fact that the second cladding region includes a fluorine-doped silica glass.

The optical fiber according to an eleventh invention of the present invention is characterized by a fact that a material of the first cladding region other than the microstructure is substantially same as a material of the second cladding region.

The optical fiber according to a twelfth invention of the present invention is characterized by a fact that the microstructure is a hole formed in parallel to a center axis of the optical fiber in a longitudinal direction.

The optical fiber according to a thirteenth invention of the present invention is characterized by a fact that a light having a predetermined wavelength propagates in a single mode.

The optical fiber according to a fourteenth invention of the present invention is characterized by a fact that a light having a wavelength equal to or longer than 1,500 nm propagates in a single mode.

The optical fiber according to a fifteenth invention of the present invention is characterized by a fact that a light having a wavelength equal to or longer than 1,250 nm propagates in a single mode.

The optical fiber according to a sixteenth invention of the present invention is characterized by a fact that, when A [μm] is a mode field diameter at a wavelength of 1,500 nm, and B [dB/m] is a bending loss with a bending of a curvature radius of 7.5 mm at a wavelength of 1,550 nm, B≦1 is satisfied, and the following Equation (1) is satisfied.

$$A \geq \log_{10} B + 8 \quad (1)$$

The optical fiber according to a seventeenth invention of the present invention is characterized by a fact that A and B further satisfy the following Equation (2).

$$A \geq \log_{10} B + 9 \quad (2)$$

The optical fiber according to an eighteenth invention of the present invention is characterized by a fact that A is in a range of 7 μm to 13 μm.

The optical fiber according to a nineteenth invention of the present invention is characterized by a fact that A is in a range of 7 μm to 12 μm.

The optical fiber according to a twentieth invention of the present invention is characterized by a fact that A is in a range of 7 μm to 11 μm.

The optical fiber according to a twenty-first invention of the present invention is characterized by a fact that B is equal to or lower than 0.1 dB/m.

The optical fiber according to a twenty-second invention of the present invention is characterized by a fact that a bending loss with a bending of a curvature radius of 7.5 mm at a wavelength of 1,550 nm is equal to or lower than 0.1 dB/m.

The optical fiber according to a twenty-third invention of the present invention is characterized by a fact that a bending loss with a bending of a curvature radius of 5.0 mm at a wavelength of 1,550 nm is equal to or lower than 0.1 dB/m.

The optical fiber according to a twenty-fourth invention of the present invention is characterized by a fact that the microstructure is a hole, and the optical fiber further comprises a sealing member for sealing an internal space of the hole.

The optical fiber according to a twenty-fifth invention of the present invention is characterized by a fact that the sealing member is an isolation wall provided on both ends of the hole.

The optical fiber according to a twenty-sixth invention of the present invention is characterized by a fact that the sealing member is isolation walls provided at arbitrary intervals in a longitudinal direction to seal the hole by partitioning the hole into a plurality of portions.

The optical fiber according to a twenty-seventh invention of the present invention is characterized by a fact that the sealing member is a refractive-index matching agent with filled in the hole at a connecting end portion, and another optical fiber is connected to the connecting end portion.

The optical fiber according to a twenty-eighth invention of the present invention is characterized by a fact that the sealing member is formed by collapsing a connecting end portion the hole to put the hole in a sealed state, and another optical fiber is connected to the connecting end portion in the sealed state.

A waveguide according to a twenty-ninth invention of the present invention includes the optical fiber according to any one of the first to twenty-eighth inventions with at least one place of bending with a curvature radius equal to or larger than 3 mm and equal to or smaller than 60 mm.

Effect of the Invention

According to the present invention, it is possible to obtain an optical fiber in which the macro-bending loss is lowered while the MFD large is maintained large. Furthermore, it is possible to obtain a waveguide including the optical fiber that is connectable to a typical SMF with low loss and capable of making the macro-bending loss low even when a bending portion having a small curvature radius is formed.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

EXPLANATIONS OF LETTERS OR NUMERALS

1 Core region
2 First cladding region
3 Hole
4 Second cladding region
10, 20, 30, 40, 50 Optical fiber
60 Connection optical fiber
61 Core region
70 Backbone-system optical fiber
100 Obstacle
A, B Bending portion
C1, C2 Connecting portion

BEST MODE(S) FOR CARRYING OUT THE INVENTION

Exemplary embodiments of an optical fiber and a waveguide according to the present invention are explained in detail below with reference to the accompanying drawings. Note that the present invention is not limited to the embodiments. The schematic structural features of the optical fibers according to the present invention are explained in the embodiments, and then optical fibers and waveguides adapted for practical use are explained in detail in examples.

Embodiments

Conventionally, in an optical fiber including an impurity-doped core region and a cladding region having a microstructure, a relative refractive-index difference Δ1 between the core region and the cladding region (second cladding region) without a microstructure is 0.3% to 0.39%, which is virtually the same as that of an SMF. The relative refractive-index difference Δ1 of the optical fiber according to the embodiments is made small, thereby making the MFD large. Even if the relative refractive-index difference Δ1 is made lower than that of the conventional optical fibers, because the difference in refractive indexes between a core region and a cladding region is extremely large, light can be confined in the core region efficiently. Therefore, the macro-bending loss occurred at a bending portion of the optical fiber can be made extremely low.

The relative refractive-index difference Δ1 is defined by the following Equation:

$$\Delta 1 = \{(n_{core} - n_{clad})/n_{core}\} \times 100\% \quad (3)$$

where $n_{core}$ is the maximum refractive index of the core region, and $n_{clad}$ is a refractive index of the second cladding region.

The core region is doped with a small amount of germanium, so that the core region can be specified easily at the time of fusion splicing. Therefore, the connection loss due to a misalignment of the centers of optical fibers can be prevented from occurring. Furthermore, when the optical fiber is fusion spliced to the SMF, germanium diffuses at the connecting portion. Thus, the connection loss can be made low.

When the region of the microstructure is larger than 20% of the total area of the optical fiber, the strength of the optical fiber is deteriorated. Thus, the region of the microstructure is set equal to or smaller than 20%, thereby maintaining the strength of the optical fiber itself as glass. The cross-sectional area of the microstructure larger than 20% is not preferable because the following problem occurs. When the optical fiber is drawn from the optical fiber preform, large stress is put on the glass portion near the microstructure in the optical fiber at a meniscus portion at which the optical fiber is drawn. This increases the possibility of breaking of the optical fiber.

An optical fiber of according to one embodiment of the present invention has microstructure of two folds rotational symmetry with respect to the center axis of the optical fiber. Such structure causes anisotropy in the refractive index profile between the X direction and the Y direction in the cross section of the optical fiber. The anisotropy between the X-axis direction and the Y-axis direction leads to an effect of maintaining a polarization plane of propagating light. The microstructure having the two folds rotational symmetry is the microstructure rotationally symmetric with respect to the center axis under only two rotations, excluding four folds rotational symmetry, six folds rotational symmetry, and the like.

An optical fiber according to another embodiment of the present invention has microstructure of six folds rotational symmetry with respect to the center axis of the optical fiber. Such structure makes the refractive index of the cross section of the optical fiber relatively constant in a circumferential direction, thus reducing polarization mode dispersion.

An optical fiber according to still another embodiment of the present invention has a microstructure of four folds rotational symmetry with respect to the center axis of the optical fiber. Such structure makes the refractive index profile in the X direction and that in the Y direction the same, thus reducing polarization mode dispersion.

The microstructure is arranged on two or more different concentric circles with respect to the center axis of the optical fiber. In this manner, a refractive index can be freely changed along the radial direction from the center axis of the optical fiber depending upon the arrangement pattern of the microstructure.

The method of doping the core region with germanium (Ge) and phosphorous (P) includes the VAD (Vapor-phase Axial Deposition) method. With this method, a doping amount can be finely adjusted. Consequently, the refractive index difference of the core region with respect to the cladding region can be adjusted on 0.01% basis.

The homogeneous material of the second cladding region is pure silica glass or fluorine-doped silica glass. The material of the first cladding region other than the microstructure is the same as that of the second cladding region. When the first cladding region does not include the microstructure, the refractive indexes of the first cladding region and the second cladding region are the same. The cladding region is composed of pure silica glass or fluorine-doped silica glass, which causes a refractive index with respect to the core region.

The microstructure is a hole, so that an average refractive index of the first cladding region can be greatly decreased. The holes can be made easily in an optical fiber preform in a longitudinal direction by using, for example, an ultrasonic drill. Hence, the microstructure can be manufactured at low cost in comparison to the case in which a liquid or a solid having a refractive index different from that of silica glass is inserted in the cladding region.

When light propagates in the single mode, a cut-off wavelength λc needs to be shorter than an operating wavelength. In the embodiments, the optical fiber can transmit light having a wavelength equal to or longer than 1,500 nm in a single mode. Therefore, the optical fiber can be used for light having a wavelength band including a C band and an L band. Preferably, the optical fiber transmits light having a wavelength of equal to or longer than 1,250 nm in a single mode. Such an optical fiber can be used for light of a broadband wavelength including an S band, the C band, the L band, an E band, and an O band.

The cut-off wavelength λc indicates the fiber cut-off wavelength λc defined by the ITU-T (International Telecommunication Union-Telecommunication Standardization Sector) G.650.1. As for the rest of terminologies not specifically defined in the specification, the definition and the measurement method by the ITU-T G.650.1 or G.650.2 will be applied.

The optical fiber of the embodiments can keep the macro-bending loss low even when the optical fiber includes the microstructure that increases the MFD. For example, the macro-bending loss of the optical fiber having the MFD of 7 μm at a wavelength of 1,550 nm is equal to or lower than 0.1 dB/m. The relationship between these two properties of the optical fiber preferably satisfies Equation (1), and more preferably satisfies Equation (2).

When light having a wavelength of 1,550 nm propagates, the MFD is 7 μm to 13 μm, preferably 7 μm to 12 μm, and more preferably 7 to 11 μm. It is assumed that the optical fiber of the embodiments is connected to, for example, an SMF having a MFD of about 10 µm. When the optical fiber of the embodiments has the MFD close to 10 µm, the loss by a mechanical splice can be reduced. When the optical fiber of the embodiments is fusion spliced to a standard single mode fiber, the MFDs of both optical fibers are close to each other. Thus, the loss due to the fusion splicing is low and fusion splicing operation can be performed easily.

When propagating light has a wavelength of 1,550 nm, the macro-bending loss with respect to bending with a curvature radius of 7.5 mm, more preferably 5.0 mm, is equal to or lower than 0.1 dB/m. Because the optical loss with respect to the bending is low as described above, it is possible to install the optical fibers in an indoor local position or the like with a small curvature radius.

A wall is provided in each hole at both sides of the optical fiber so that it is possible to prevent contaminants from entering the holes. Whereby, increase of the transmission loss due to the contamination inside the holes can be suppressed.

In addition, by providing an isolation wall for prevention of contaminant entry at an arbitrary position in each hole, structural change in the cross section of the optical fiber in the longitudinal direction due to the provision of the isolation walls is small. Therefore, shape variation of the MFD during transmission of light can be small at the positions where the isolation walls are provided, and accordingly, the resultant transmission loss can be also lowered.

The holes in the end portions are filled with a refractive-index matching agent. Accordingly, the MFDs of the end portions of the optical fiber according to the present invention and the SMF can be close to each other when the optical fiber according to the present invention is connected to an SMF. Therefore, the connection loss caused by a connection of the optical fiber according to the present invention to an existing SMF waveguide can be suppressed.

Conventional optical fibers are used as a light transmission material with a bending of a large curvature radius to make the macro-bending loss low. On the other hand, the optical fiber having the structure according to the present invention causes an extremely low macro-bending loss. Therefore, even when the optical fiber according to the present invention is used in a light waveguide in a state of being bent with a curvature radius not smaller than 3 mm and not larger than 60 mm, the transmission loss is low. Thus, the optical fiber can be installed in, for example, an indoor narrow space.

EXAMPLE

Optical Fiber Example 1-1

Figure 1:
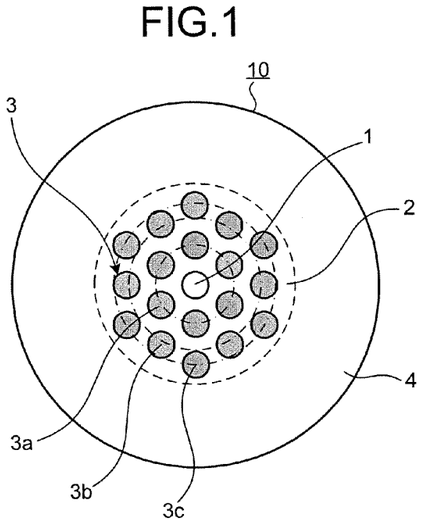
FIG. 1 is a lateral cross section of an optical fiber that is used in optical fiber Example 1-1.

FIG. 1 is a lateral cross section of an optical fiber that is used in optical fiber Example 1-1. In FIG. 1, an optical fiber 10 includes a core region 1, a first cladding region 2 formed as a layer around the core region 1, and a second cladding region 4 formed as a layer around the first cladding region 2. The first cladding region 2 has a plurality of holes 3 as the microstructure. The core region 1 is made of silica glass doped with germanium. The relative refractive-index difference of the core region 1 with respect to pure silica glass is 0.28%. On the other hand, the first cladding region 2 other than the holes 3 and the second cladding region 4 are made of pure silica glass. The holes 3 each penetrate through the optical fiber 10 in parallel along the center axis of the optical fiber 10 in the longitudinal direction. The rate of change of the cross section of the holes 3 along the center axis in the longitudinal direction is equal to or less than 10% in area ratio. An interval between adjacent holes 3 in the lateral cross section, i.e., a hole interval A, is 6.0 µm to 11.0 µm. The total cross-sectional area ratio of 18 holes 3 with respect to the cross-sectional area of the optical fiber is 10% to 19%.

As shown in FIG. 1, the 18 holes 3 are formed on three concentric circles with respect to the center of the optical fiber such that six of the holes 3 are located on each concentric circle. That is, holes 3a are located on the concentric circle closest to the center of the optical fiber, holes 3b are located on the second-closest concentric circle, and holes 3c are located on the third-closest concentric circle.

The characteristics of the optical fiber 10 are as follows. The MFD was 7.0 µm to 10.0 µm at a wavelength of 1,550 nm. The macro-bending loss with respect to bending with a curvature radius of 7.5 mm at a wavelength of 1,550 nm was 0.0018 dB/m. The cut-off wavelength was 1,100 nm to 1,240 nm. The macro-bending loss with respect to a bending with a curvature radius of 5 mm at a wavelength of 1,550 nm was 0.085 dB/m.

The lateral cross-sectional shape of the holes 3 of the optical fiber 10 is such that the holes 3 are arranged to have six folds rotational symmetry with respect to the center axis. Such an arrangement pattern made polarization mode dispersion equal to or less than 0.5 $ps/km^{1/2}$.

Optical Fiber Example 1-2

In a similar manner to optical fiber Example 1-1, an optical fiber was manufactured. The optical fiber includes the core region 1 that was doped with germanium so that the relative refractive-index difference of the core region 1 with respect to pure silica glass is 0.22% to 0.27%, and the cladding region (the first cladding region 2 and the second cladding region 4) having the cross-sectional structure shown in FIG. 1. The second cladding region 4 is made of pure silica glass. The hole interval A is 6.0 µm to 10.0 µm, and the total cross-sectional area ratio of 18 holes 3 with respect to the cross-sectional area of the optical fiber is 10% to 18%. The MFD of the optical fiber was 7.0 µm to 7.6 µm at a wavelength of 1,550 nm. The macro-bending loss with respect to bending with a curvature radius of 7.5 mm at a wavelength of 1,550 nm was 0.002 dB/m. The cut-off wavelength was 1,150 nm to 1,490 nm. In addition, the macro-bending loss with respect to bending with a curvature radius of 5 mm at a wavelength of 1,550 nm was 0.01 dB/m to 0.09 dB/m.

Optical Fiber Example 1-3

An optical fiber was manufactured as follows. The first cladding region 2 having the microstructure shown in FIG. 1 is doped with fluorine such the relative refractive-index difference of the first cladding region 2 with respect to pure silica glass is −0.1%, and a doping amount of germanium to be doped in the core region 1 is adjusted such that the relative refractive-index difference of the core region 1 with respect to the second cladding region 4 is 0.28%. In this example also, it was confirmed that the cut-off wavelength, the MFD, and the macro-bending loss are virtually the same as those in optical fiber Example 1-1.

Optical Fiber Example 2-1

Figure 2:
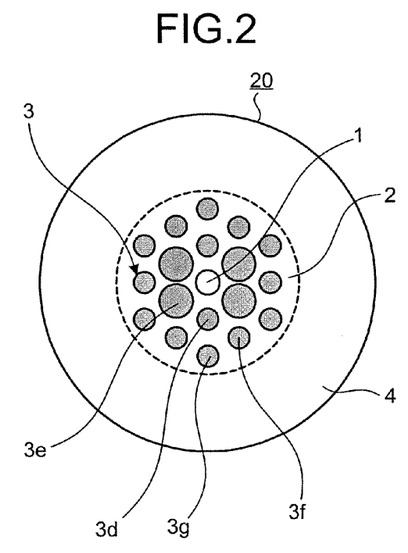
FIG. 2 is a lateral cross section of an optical fiber that is used in optical fiber Example 2-1.

FIG. 2 is a lateral cross section of an optical fiber that is used in optical fiber Example 2-1. In a similar manner to the optical fiber 10 in optical fiber Example 1-1, the core region 1 of an optical fiber 20 shown in FIG. 2 is made of silica glass doped with germanium, and the first cladding region 2 other than the holes 3 and the second cladding region 4 are made of pure silica glass. The relative refractive-index difference of the core region 1 with respect to pure silica glass is 0.28%. In the optical fiber 20 shown in FIG. 2, the lateral cross-sectional shape of the holes 3 is such that the holes 3 are arranged to have two folds rotational symmetry. In other words, large holes 3e and small holes 3d formed on the concentric circle closest to the center have a line-symmetrical relation. Six small holes 3f are formed on the second-closest concentric circle, and six small holes 3g are formed on the third-closest concentric circle. The feature of the optical fiber 20 is as follows. When the direction of the longitudinal center axis is defined as the Z-axis direction, the refractive index profile in the X-axis direction is largely different from that in the Y-axis direction in the cross section of the optical fiber, which leads to an effect of maintaining a polarization plane of propagating light.

Optical Fiber Example 2-2

An optical fiber having the macrostructures shown in FIG. 2 was manufactured in the same manner as the optical fiber 10 in optical fiber Example 2-1. In a similar manner to the optical fiber 10 in optical fiber Example 1-1, the core region 1 is made of silica glass doped with germanium, and the first cladding region 2 other than the holes 3 and the second cladding region 4 are made of pure silica glass. The relative refractive-index difference of the core region 1 with respect to pure silica glass is 0.28%. The interval between each large hole 3e and the core region 1 is equal to or smaller than 0.5 μm, i.e., the large holes 3e are located extremely close to the core region 1. Mode birefringence in this case was $2.0 \times 10^{-4}$.

Figure 3:
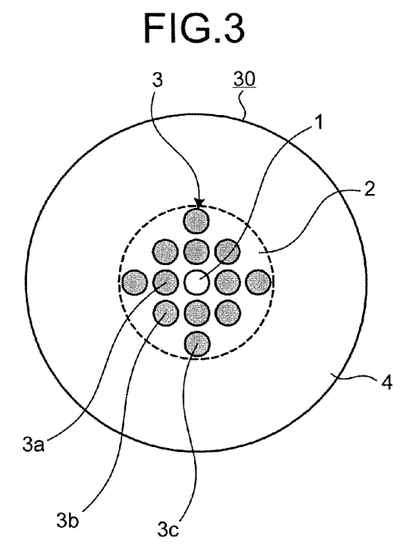
FIG. 3 is a lateral cross section of an optical fiber that is used in optical fiber Example 3-1.

FIG. 3 is a lateral cross section of an optical fiber that is used in optical fiber Example 3-1. In a similar manner to the optical fiber 10 in optical fiber Example 1-1, the core region 1 of an optical fiber 30 shown in FIG. 3 is made of silica glass doped with germanium, and the first cladding region 2 other than the holes 3 and the second cladding region 4 are made of pure silica glass. The relative refractive-index difference of the core region 1 with respect to pure silica glass is 0.28%. In the optical fiber 30, the holes 3 are arranged to have four folds rotational symmetry with respect to the center axis as shown in FIG. 3. Specifically, four holes 3a are arranged on the concentric circle closest to the center, four holes 3b are arranged on the second concentric circle at positions determined by rotating 45 degrees from the holes 3a, and four holes 3c are arranged on the third concentric circle at positions determined by rotating another 45 degrees on radial lines of the holes 3a with respect to the center. In the optical fiber 30 having such an arrangement pattern, polarization mode dispersion was equal to or less than 0.3 ps/km$^{1/2}$.

Optical Fiber Example 4-1

Figure 4:
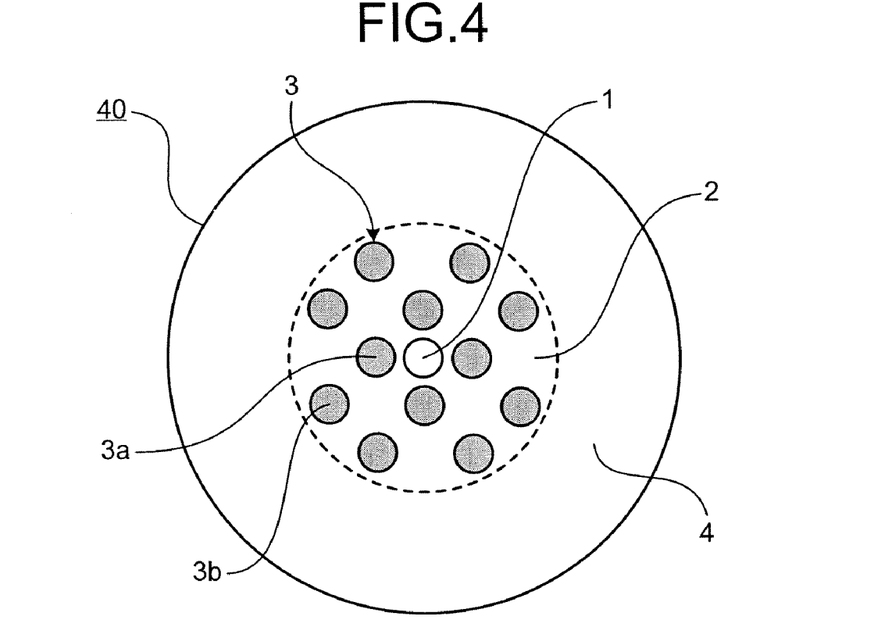
FIG. 4 is a lateral cross section of an optical fiber that is used in optical fiber Example 4-1.

FIG. 4 is a lateral cross section of an optical fiber in optical fiber Example 4-1. An optical fiber 40 shown in FIG. 4 includes the core region 1, the first cladding region 2 formed as a layer around the core region 1, and the second cladding region 4 formed as a layer around the first cladding region 2. The first cladding region 2 has the holes 3 as the microstructured portions. The core region 1 is made of silica glass doped with germanium. Two types of optical fibers were manufactured in this example. The relative refractive-index differences Δ1 of the core region 1 with respect to pure silica glass in the two optical fibers are 0.28% and 0.29%. The diameters of the core region 1 of the two optical fibers are both 7.4 μm. On the other hand, the first cladding region 2 other than the holes 3 and the second cladding region 4 are made of pure silica glass. The holes 3 penetrate through the optical fiber 40 and are parallel to the center axis of the optical fiber 40 in the longitudinal direction. The rate of change of the cross section of the holes 3 along the center axis in the longitudinal direction is equal to or less than 5% in area ratio. The total cross-sectional area ratio of 12 holes 3 with respect to the cross-sectional area of the optical fiber is 8.67%.

The holes 3 each have an approximately round shape in the cross section of the optical fiber 40, and have the same cross-sectional area. The diameter d of each of the holes 3 is 6.8 μm. Four holes 3a are arranged on the concentric circle closest to the center of the first cladding region 2, and the distance (L1) between the center of each of the holes 3a and the center of the cross section of the optical fiber is 7.7 μm. The holes 3a are arranged to have four folds rotational symmetry. There are 8 holes 3b arranged in the outer portion of the first cladding region 2 with respect to the center of the optical fiber. The distance (L2) between the center of each of the holes 3b and the center of the cross section of the optical fiber is 16.435 μm, and each of the holes 3b is positioned on the extended line connecting two adjacent holes 3a arranged in the inner portion of the first cladding region 2.

The method of manufacturing the optical fiber shown in this example is as follows. First, silica glass including a core region doped with germanium by the VAD method was manufactured. Next, a pure silica layer was formed on the outer surface of the silica glass by the OVD method. With the above steps, a preform having an outer diameter of 40 mm and a core diameter of 3.7 mm was manufactured. The preform was drilled using a mechanical drill to form holes each having a finishing diameter of 3.4 mm, and the surface of the inner wall of each hole was polished. Then, the preform was drawn to be an optical fiber with a cladding diameter of 80 μm. The characteristics of optical fibers Sample 1 and Sample 2 manufactured by the above method are shown in Table 1.

TABLE 1

|  | Δ1 % | d μm | Cut-off wavelength Nm | Macro-bending loss r = 7.5 mm @1550 nm dB/m | Macro-bending loss r = 5 mm @1550 nm dB/m | MFD @1550 nm μm |
|---|---|---|---|---|---|---|
| Sample 1 | 0.28 | 6.8 | <1200 | 0.053 | 0.28 | 7.27 |
| Sample 2 | 0.29 | 6.8 | <1200 | 0.041 | 0.22 | 7.25 |

As shown in Table 1, the cut-off wavelengths λc are shorter than 1,200 nm, and light in a wavelength bands of 1.3 μm (1,280 nm to 1,330 nm) and 1.55 μm (1,530 nm to 1,565 nm) propagates in a single mode. The MFDs were equal to or larger than 7.0 μm at a wavelength of 1,550 nm, and the connection losses are low when the optical fibers each mechanically connected to a standard SMF. Nonlinear phenomena occurring in the optical fibers can also be kept low.

The macro-bending losses with respect to bending with a curvature radius of 7.5 mm at a wavelength of 1,550 nm were equal to or lower than 0.1 dB/m, which indicates that the optical fibers are fully suitable for an application in a condition where the optical fibers are bent in a small diameter. As described above, the lateral cross-sectional shape of the holes 3 in the optical fiber 40 is such that the holes 3 are arranged to have four folds rotational symmetry. Polarization mode dispersion was equal to or less than 0.1 ps/km$^{1/2}$.

Optical Fiber Example 4-2

Optical fibers Sample 3 and Sample 4 were investigated by simulation. In the optical fibers Sample 3 and Sample 4, the positions of the holes and the diameter of the holes are changed from the samples in optical fiber Example 4-1 shown in FIG. 4. Note that it was confirmed that a result of the simulation on the optical fibers Sample 1 and Sample 2 actually manufactured in optical fiber Example 4-1 shows an overall agreement with the characteristics of the actually manufactured optical fibers.

The core diameter is 7.6 μm. The distance L1 between the center of each of the holes 3a positioned at the inner side and the center of the core region is 11 μm. The distance L2 between the center of each of the holes 3b positioned at the outer side and the center of the core region is 22 μm. In the examination, the diameter d (i.e., hole diameter) of each of the holes 3 is 10.4 μm, the outer diameter of the optical fiber is 90 μm, and the total cross-sectional area ratio of 12 holes 3 with respect to the cross-sectional area of the optical fiber is 16%. The result of the examination is shown in Table 2.

TABLE 2

|  | Δ1 % | d μm | Cut-off wavelength Nm | Macro-bending loss r = 7.5 mm @1550 nm dB/m | MFD @1550 nm μm |
| --- | --- | --- | --- | --- | --- |
| Sample 3 | 0.28 | 10.4 | 1320 | 0.044 | 8.38 |
| Sample 4 | 0.29 | 10.4 | 1340 | 0.068 | 8.42 |

As shown in Table 2, the cut-off wavelengths were equal to or shorter than 1,350 nm, and the macro-bending losses were sufficiently low. Therefore, the optical fibers Sample 3 and Sample 4 have characteristics to fully function as an optical fiber flexible in bending. The MFDs were equal to or larger than 8.0 μm. Each of the optical fibers can be mechanically connected to a standard SMF with low connection loss because the difference between MFDs of the SMF and each of the optical fibers is extremely small. The MFDs of the optical fibers were increased so that the nonlinearlity can be greatly suppressed compared to the optical fibers in optical fiber Example 4-1.

Optical Fiber Example 4-3

An optical fiber was manufactured as follows. The first cladding region 2 having the microstructure shown in FIG. 4 is doped with fluorine so that the relative refractive-index difference of the first cladding region 2 with respect to pure silica glass is −0.1%, and a doping amount of germanium to be doped in the core region 1 is adjusted so that the relative refractive-index difference of the core region 1 with respect to the second cladding region 4 is 0.28%. In this example also, it was confirmed that the cut-off wavelength, the MFD, and the macro-bending loss are virtually the same as those of Sample 1 in optical fiber Example 4-1.

Optical Fiber Example 5-1

Figure 5:
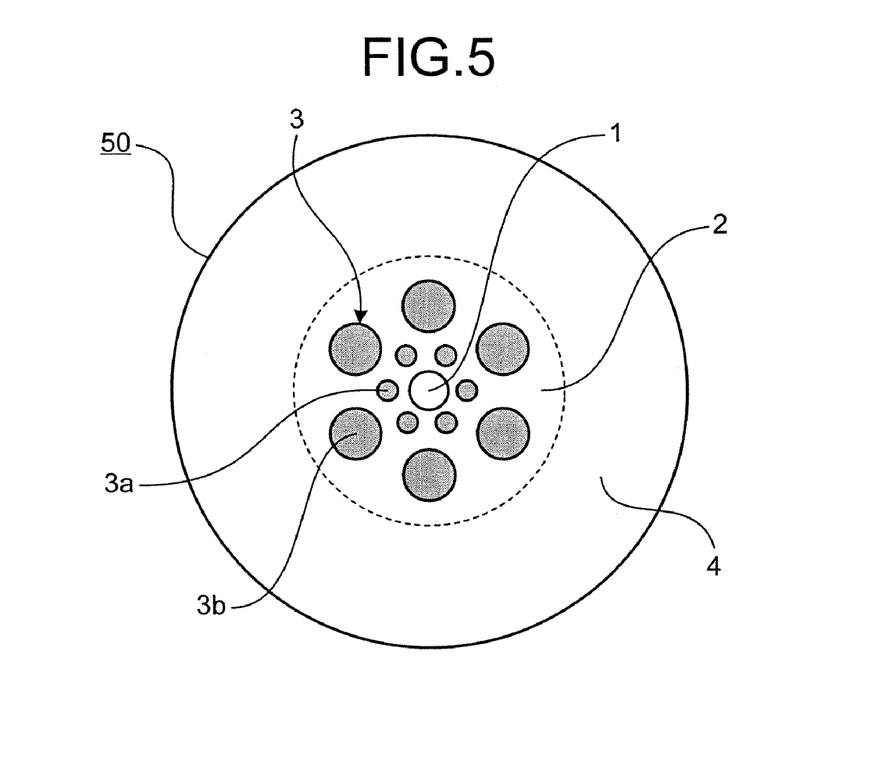
FIG. 5 is a lateral cross section of an optical fiber that is used in optical fiber Example 5-1.

FIG. 5 is a lateral cross section of an optical fiber in optical fiber Example 5-1. Similarly to the optical fiber 10, an optical fiber 50 shown in FIG. 5 includes the core region 1, the first cladding region 2 formed as a layer around the core region 1, and the second cladding region 4 formed as a layer around the first cladding region 2. The first cladding region 2 has the holes 3 as the microstructured portions. The core region 1 is made of silica glass doped with germanium. Two types of optical fibers were manufactured in this example. The relative refractive-index differences Δ1 of the core region 1 of the two optical fibers with respect to pure silica glass are 0.28% and 0.29%. The diameters of the core region 1 of the two optical fibers are 7.4 μm. On the other hand, the first cladding region 2 other than the holes 3 and the second cladding region 4 are made of pure silica glass. The holes 3 penetrate through the optical fiber 50 and are parallel to the center axis of the optical fiber 50 in the longitudinal direction. The rate of change of the cross section of the holes 3 along the center axis in the longitudinal direction is equal to or less than 5% in area ratio. The total cross-sectional area ratio of the 12 holes 3 with respect to the cross-sectional area of the optical fiber 50 is 6.8%.

The cross-sectional shape of each of the holes 3 arranged in the first cladding region 2 is a substantially perfect circle. In FIG. 5, holes 3a are arranged in the inner portion of the internal region of the first cladding region 2, and holes 3b are arranged in the outer portion of the internal region of the first cladding region 2. The holes 3a each have a relatively small cross-sectional area with a diameter d1 of 3 μm, and the holes 3b each have a relatively large cross-sectional area with a diameter d2 of 8 μm. The holes having the same diameter are located on the circumference of the same concentric circle. The distance L1 between the center of the hole 3a having the relatively small cross-sectional area and the center of the cross-section of the optical fiber is 6 μm. The interval between the centers of adjacent holes having the relatively small cross-sectional area is 6 μm. The distance L2 between the center of the hole 3b having the relatively large cross-sectional area and the center of the cross-section of the optical fiber is 13.15 μm. The interval between the centers of adjacent holes having the relatively large cross-sectional area is 13.15 μm. The holes having the same diameter are arranged to have six folds rotational symmetry with respect to the center of the cross section of the optical fiber. The positional relation between the holes 3a having the relatively small cross-sectional area and the holes 3b having the relatively large cross-sectional area is such that adjacent holes 3a and 3b satisfies the following condition. The line connecting the center of the cross section of the optical fiber and the center of the hole 3a arranged in the inner portion of the internal region of the first cladding region 2, and the line connecting the center of the cross section of the optical fiber and the center of the hole 3b arranged in the outer portion of the internal region of the first cladding region 2, form an angle of 30 degrees. The method of manufacturing the optical fiber is the same as that in optical fiber Example 1-1, and the characteristics of the actually manufactured Sample 5 and Sample 6 are shown in Table 3.

TABLE 3

|  | Δ1 % | Cut-off wavelength nm | Macro-bending loss r = 7.5 mm @1550 nm dB/m | MFD @1550 nm μm |
| --- | --- | --- | --- | --- |
| Sample 5 | 0.28 | 1310 | 0.048 | 7.11 |
| Sample 6 | 0.29 | 1320 | 0.04 | 7.10 |

As shown in Table 3, the cut-off wavelengths were 1,310 nm and 1,320 nm, thus the optical fiber 50 transmits light in a wavelength band of 1.55 μm (1,530 nm to 1,565 nm) in a single mode. The MFDs were equal to or larger than 7.0 μm at a wavelength of 1,550 nm, and the connection losses were low when the optical fibers Sample 5 and Sample 6 each are mechanically connected to a standard SMF. Nonlinear phenomena occurring in the optical fiber 50 can also be kept low. The macro-bending losses with respect to bending with a curvature radius of 7.5 mm at a wavelength of 1,550 nm were equal to or lower than 0.1 dB/m, which indicates that the optical fibers are fully suitable for a condition in which an optical fiber is bent in a small diameter. As described above, the cross-sectional shapes of the holes 3a and the holes 3b in the optical fiber 50 are such that the holes 3a are arranged to have six folds rotational symmetry and the holes 3b are arranged to have six folds rotational symmetry. Polarization mode dispersion was equal to or less than 0.3 ps/km$^{1/2}$.

The optical fibers used in optical fiber Examples 1 to 5 were heated at both end portions thereof to melt the cladding regions and the holes were collapsed, thereby forming isolation walls. In addition, isolation walls were formed by selectively heating the holes at arbitrary positions in the longitudinal direction of the optical fibers in the same manner. Whereby, it is possible to prevent contaminants or the like from entering the holes.

Optical Fiber Connection Example

The following three methods were used for connecting the optical fiber 10 in optical fiber Example 1-1 shown in FIG. 1 and an SMF to be connected (optical fiber complying with the ITU G.652; hereinafter, referred to as "connection optical fiber 60"). In the optical fiber 10, the MFD was about 7 μm to 8 μm at a wavelength of 1,550 nm. In the SMF, the MFD is 10.4 μm at a wavelength of 1,550 nm. The connection loss at the connecting portion during transmission of light having a wavelength of 1,550 nm was measured.

Connection Example 1

Figure 6:
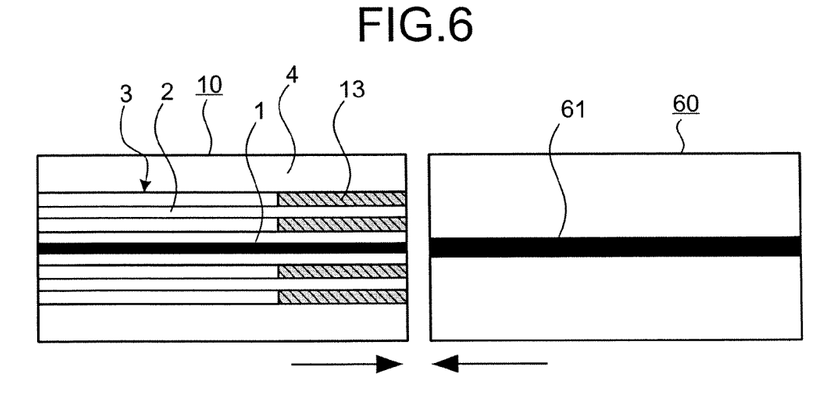
FIG. 6 is a longitudinal cross section for explaining a method of connecting optical fibers according to Connection Example 1.

FIG. 6 is a longitudinal cross section for explaining a method of connecting optical fibers according to Connection Example 1. In Connection Example 1, the spaces of the holes 3 were filled with a refractive-index matching agent 13 at the end portion of the optical fiber 10. Thereafter, the end portion of the optical fiber 10 with the spaces of the holes filled with the refractive-index matching agent 13 was connected to an end portion of the connection optical fiber 60 in a manner that the center axis of the core region 1 is brought in line with the center axis of the core region 61. The refractive-index matching agent 13 is grease having high viscosity with a refractive index of about 1.44 with respect to light having a wavelength of 1,550 nm.

By filling the holes of the optical fiber 10 with the refractive-index matching agent 13, the refractive index of the first cladding region 2 became close to that of the second cladding region 4 at the end portion of the optical fiber 10. Accordingly, the MFD of the optical fiber 10 increases, and became close to the MFD of the connection optical fiber 60. Furthermore, because the refractive index of the cladding region became substantially uniform at the connecting end portion of the optical fiber 10, a connection loss caused by a Fresnel reflection can be reduced. The connection loss at the connecting end portion of the optical fiber was measured to be equal to or lower than 0.1 dB.

Connection Example 2

Figure 7:
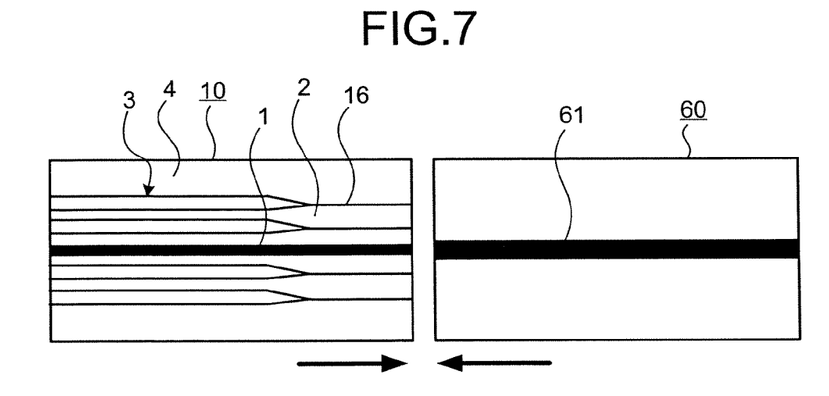
FIG. 7 is a longitudinal cross section for explaining a method of connecting optical fibers according to Connection Example 2.

FIG. 7 is a longitudinal cross section for explaining a method of connecting optical fibers according to Connection Example 2. In Connection Example 2, the holes 3 were collapsed at the end portion of the optical fiber 10 by heating, and the optical fiber 10 and the connection optical fiber 60 were connected in such a manner that the center axis of the core region 1 is brought in line with the center axis of the core region 61.

Sealed regions 16 were formed by collapsing the holes 3, whereby the refractive index of the first cladding region 2 became substantially equal to that of the second cladding region 4 at the end portion of the optical fiber 10. Therefore, the effect same as that of Connection Example 1 could be obtained. The connection loss at the connecting end portion was reduced compared to a case in which the optical fiber 10 is connected to the connection optical fiber 60 without performing any treatment to the end portion of the optical fiber 10. The connection loss at the connecting end portion of the optical fiber was measured similarly to Connection Example 1. The connection loss was equal to or lower than 0.1 dB.

Connection Example 3

The optical fiber 10 was fusion spliced to the connection optical fiber 60 while the holes are collapsed at the end portion of the optical fiber 10 as described in Connection Example 2. Regarding the fusion condition, if a high power is abruptly discharged, each of the holes is expanded and can disrupt, which causes the cavity or the defect portion at the fusion-spliced portion. Therefore, in Connection Example 3, a discharging power was set to be extremely low, a discharging time was set to be long, and the fusion splicing was performed by gradually collapsing the holes.

Similarly to the above connection examples, the refractive index profile at the connecting portion became substantially uniform. The MFD at the connecting portion was enlarged, and became close to the MFD of the optical fiber to be connected. The fusion splicing of the optical fibers causes germanium doped in the core regions of the optical fibers mutually diffused, so the MFDs of the optical fibers at the connecting portions became close to each other compared to Connection Example 1 and Connection Example 2, thus making the connection loss lower. The connection loss at the connecting end portion of the optical fiber in Connection Example 3 was measured similarly to the above connection examples. The connection loss was equal to or lower than 0.05 dB.

Optical Fiber Usage Example

Figure 8:
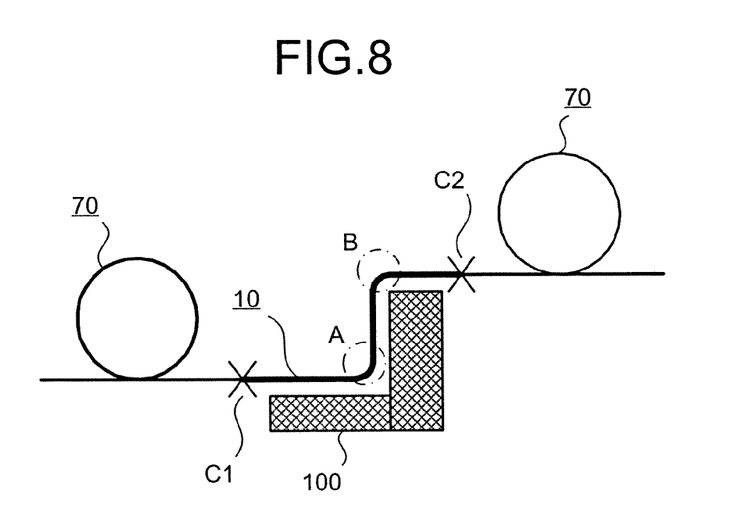
FIG. 8 is a schematic diagram for explaining an example in which the optical fiber according to an example is used in a waveguide.

FIG. 8 is a diagram for explaining an example in which the optical fiber according to the embodiments is used in a waveguide. In FIG. 8, the optical fiber 10 shown in [optical fiber Example 1] is connected to backbone-system optical fibers 70 and 70 complying with G. 652 at both connecting portions C1 and C2 at the front and back ends. This usage example takes the case where the optical fiber 10 needs to be bent at a right angle at two places in the system due to an obstacle 100. The optical fiber 10 is bent with a curvature radius of 7.5 mm at each of bending portions A and B.

When only the backbone-system optical fiber 70 was laid in the system shown in FIG. 8, a high macro-bending loss in the amount of about 10 dB occurred at each of the bending portions A and B. Therefore, the total transmission loss of light became considerably high in the whole backbone system.

However, use of the optical fiber 10 at the obstacle 100 as shown in FIG. 8 could suppress the macro-bending loss occurred at the bending portions A and B to be significantly small, and the macro-bending loss occurred at this time was equal to or lower than 0.1 dB. The MFD of the optical fiber 10 was larger than conventional optical fibers which have holes and are strong against bending, and the macro-bending loss occurred at one connecting portion was equal to or lower than 0.1 dB when the methods of the above connection examples were used. Consequently, the transmission loss in the whole backbone system could be suppressed to be extremely low compared to the case of only installing optical fiber of the backbone system.

As described above, the optical fiber and the waveguide according to the present invention are effective when being used as an optical fiber cable in the system having a bending portion, and especially are most suitable for an optical fiber cable such as a drop optical fiber which is used, for example, for installing an optical fiber cable in an office, a home, or a mansion, an indoor optical fiber cable, and an optical fiber cable for indoor wiring.

INDUSTRIAL APPLICABILITY

As described above, the optical fiber and the waveguide according to the present invention are effective for achieving both of the reduction of the connection loss occurred when connecting to an SMF and the reduction of the macro-bending loss occurred when a small bending is formed, and especially are suitable for various optical fiber cables such as a drop optical fiber which is used, for example, for installing an optical fiber cable in an office, a home, or a mansion, an indoor optical fiber cable, and an optical fiber cable for indoor wiring, and a waveguide formed by using the various optical fiber cables.

The invention claimed is:

1. An optical fiber comprising:
a core region doped with an impurity;
a first cladding region formed in a layered structure around the core region, the first cladding region including a microstructure; and
a second cladding region formed in a layered structure around the first cladding region, the second cladding region including a homogeneous material, wherein
a relative refractive-index difference between the core region and the second cladding region is equal to or larger than 0.22% and smaller than 0.3%, wherein a material of the first cladding region other than the microstructure is substantially same as a material of the second cladding region.

2. The optical fiber according to claim 1, wherein a ratio of a total cross-sectional area of the microstructure of the first cladding region to a total cross-sectional area of the core region, the first cladding region, and the second cladding region is less than 20%.

3. The optical fiber according to claim 1, wherein a cross-sectional shape of an arrangement of the microstructure of the first cladding region is two-fold rotational symmetric with respect to a center axis.

4. The optical fiber according to claim 1, wherein a cross-sectional shape of an arrangement of the microstructure of the first cladding region is six-fold rotational symmetric with respect to a center axis.

5. The optical fiber according to claim 1, wherein a cross-sectional shape of an arrangement of the microstructure of the first cladding region is four-fold rotational symmetric with respect to a center axis.

6. The optical fiber according to claim 1, wherein at least three of the microstructure are arranged on an identical circumference of a circle in a lateral cross section of the optical fiber.

7. The optical fiber according to claim 1, wherein the microstructure is arranged on two or more circumferences of circles having different diameters.

8. The optical fiber according to claim 1, wherein the core region is formed with a silica glass that is doped with at least one of germanium and phosphor.

9. The optical fiber according to claim 1, wherein the second cladding region is formed with a pure silica glass.

10. The optical fiber according to claim 1, wherein the second cladding region is formed with a fluorine-doped silica glass.

11. The optical fiber according to claim 1, wherein the microstructure is a hole formed in parallel to a center axis of the optical fiber in a longitudinal direction.

12. The optical fiber according to claim 1, wherein the optical fiber propagates a light having a predetermined wavelength in a single mode.

13. The optical fiber according to claim 12, wherein the optical fiber propagates a light having a wavelength equal to or longer than 1,500 nanometers in a single mode.

14. The optical fiber according to claim 12, wherein the optical fiber propagates a light having a wavelength equal to or longer than 1,250 nanometers in a single mode.

15. The optical fiber according to claim 1, wherein a mode field diameter at a wavelength of 1,500 nanometers and a bending loss with a bending of a curvature radius of 7.5 millimeters at a wavelength of 1,550 nanometers satisfy $A \geq \log_{10} B + 8$, where A is the mode field diameter in micrometers and B is the bending loss in decibels per meter, where $B \leq 1$.

16. The optical fiber according to claim 15, wherein the mode filed diameter and the bending loss further satisfy $A \geq \log_{10} B + 9$.

17. The optical fiber according to claim 15, wherein the mode field diameter is in a range of 7 micrometers to 13 micrometers.

18. The optical fiber according to claim 15, wherein the mode field diameter is in a range of 7 micrometers to 12 micrometers.

19. The optical fiber according to claim 15, wherein the mode field diameter is in a range of 7 micrometers to 11 micrometers.

20. The optical fiber according to claim 15, wherein the bending loss is equal to or smaller than 0.1 decibel per meter.

21. The optical fiber according to claim 1, wherein a bending loss with a bending of a curvature radius of 7.5 millimeters at a wavelength of 1,550 nanometers is equal to or smaller than 0.1 dB/m.

22. The optical fiber according to claim 1, wherein a bending loss with a bending of a curvature radius of 5.0 millimeters at a wavelength of 1,550 nanometers is equal to or smaller than 0.1 dB/m.

23. The optical fiber according to claim 1, wherein
the microstructure is a hole, and the optical fiber further comprises a sealing member for sealing an internal space of the hole.

24. The optical fiber according to claim 23, wherein the sealing member is an isolation wall provided on both ends of the hole.

25. The optical fiber according to claim 23, wherein the sealing member is isolation walls provided at arbitrary intervals in a longitudinal direction to seal the hole by partitioning the hole into a plurality of portions.

26. The optical fiber according to claim 23, wherein
the sealing member is a refractive-index matching agent filled in the hole at a connecting end portion, and
another optical fiber is connected to the connecting end portion in which the refractive-index matching agent is filled.

27. The optical fiber according to claim 23, wherein
the sealing member is formed by collapsing the hole in a connecting end portion, and
another optical fiber is connected to the connecting end portion in a sealed state.

28. A waveguide comprising an optical fiber that includes
a core region doped with an impurity;
a first cladding region formed in a layered structure around the core region, the first cladding region including a microstructure; and
a second cladding region formed in a layered structure around the first cladding region, the second cladding region including a homogeneous material, wherein
a relative refractive-index difference $\Delta 1$ between the core region and the second cladding region is equal to or larger than 0.22% and smaller than 0.3%, and
at least one place of the optical fiber is bent with a curvature radius equal to or larger than 3 millimeters and equal to or smaller than 60 millimeters, wherein
a material of the first cladding region other than the microstructure is substantially same as a material of the second cladding region.

* * * * *